(12) United States Patent
Taniuchi (10) Patent No.: US 10,773,460 B2
(45) Date of Patent: Sep. 15, 2020

(54) METHOD AND APPARATUS FOR MANUFACTURING THREE-DIMENSIONAL BODY

(71) Applicant: CANON KABUSHIKI KAISHA, Tokyo (JP)

(72) Inventor: Hiroshi Taniuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 15/556,604

(22) PCT Filed: Mar. 8, 2016

(86) PCT No.: PCT/JP2016/001270
§ 371 (c)(1),
(2) Date: Sep. 7, 2017

(87) PCT Pub. No.: WO2016/143334
PCT Pub. Date: Sep. 15, 2016

(65) Prior Publication Data
US 2018/0056596 A1    Mar. 1, 2018

(30) Foreign Application Priority Data

Mar. 12, 2015 (JP) ................................. 2015-050064

(51) Int. Cl.
*B29C 64/40* (2017.01)
*B29C 64/295* (2017.01)
(Continued)

(52) U.S. Cl.
CPC ............ *B29C 64/40* (2017.08); *B29C 64/165* (2017.08); *B29C 64/295* (2017.08); *B33Y 10/00* (2014.12); *B33Y 30/00* (2014.12)

(58) Field of Classification Search
CPC ..... B29C 64/40; B29C 64/165; B29C 64/295; B29C 64/141; B33Y 30/00; B33Y 10/00
See application file for complete search history.

(56) References Cited

U.S. PATENT DOCUMENTS 5,286,573 A * 2/1994 Prinz ....................... B22F 3/115
                                                          264/308
5,740,051 A * 4/1998 Sanders, Jr. .......... B29C 64/106
                                                          700/119
(Continued)

FOREIGN PATENT DOCUMENTS

EP         0250121 A2    12/1987
JP    2012-040726 A      3/2012
(Continued)

*Primary Examiner* — Jeffrey M Wollschlager
(74) *Attorney, Agent, or Firm* — Canon U.S.A., Inc. IP Division (57) ABSTRACT

Provided is a method for manufacturing a three-dimensional body. This method includes placing around an in-process three-dimensional body a support configured to hold up the in-process three-dimensional body and producing the three-dimensional body while holding up the in-process three-dimensional body with the support. This method is characterized in that the support is made from a support material including multiple materials with different melting points, and that the support is placed in such a manner that a first material, the material with the lowest melting point, flows with the others remaining solid.

12 Claims, 6 Drawing Sheets

(51) Int. Cl.
*B29C 64/165* (2017.01)
*B33Y 10/00* (2015.01)
*B33Y 30/00* (2015.01)

(56) References Cited

U.S. PATENT DOCUMENTS

| | | | |
|---|---|---|---|
| 10,022,889 B2* | 7/2018 | Demuth | B28B 1/001 |
| 2016/0023373 A1* | 1/2016 | Demuth | D01F 1/02 |
| | | | 264/653 |
| 2017/0087774 A1* | 3/2017 | Pawloski | B33Y 70/00 |

FOREIGN PATENT DOCUMENTS

| | | |
|---|---|---|
| JP | 2014-24329 A | 2/2014 |
| JP | 2016-074178 A | 5/2016 |
| WO | 97/17664 A1 | 5/1997 |
| WO | 2013/190817 A1 | 12/2013 |
| WO | 2015/056230 A1 | 4/2015 |

* cited by examiner

METHOD AND APPARATUS FOR MANUFACTURING THREE-DIMENSIONAL BODY

CROSS-REFERENCE TO RELATED APPLICATIONS

This application is a National Stage filing of International Application No. PCT/JP2016/001270 filed Mar. 8, 2016, which claims the benefit of Japanese Patent Application No. 2015-050064, filed Mar. 12, 2015, the disclosures of each of which are hereby incorporated by reference herein in their entirety.

TECHNICAL FIELD

The present invention relates to a method and an apparatus for manufacturing a three-dimensional body.

BACKGROUND ART

There have been some known additive methods for fabricating a three-dimensional body, such as optical fabrication. In these methods, as suggested by their name, a three-dimensional body is produced by additively stacking cross-sectional patterns. With no mold or similar equipment required, the three-dimensional body can be fabricated directly from its 3D (design) data. Additive fabrication is thus commonly used in product prototyping, in which it is needed to make a small number of three-dimensional bodies in a short period of time. A typical limitation to additive fabrication is the need for a support. By additive fabrication, in which patterns are built up in layers, it is theoretically impossible to produce a structure that has any portion that would be isolated during the process of fabrication just like, for example, the tip of a drooping branch of a tree. To make such a portion by additive fabrication, it is necessary to provide a support that will not be left in the finished three-dimensional body, or "a prop," under the portion that would be isolated, and to remove the support after the completion of fabrication.

The removal of the support is basically manual work. As a natural consequence of its purpose, additive fabrication is not often used to mass-produce a single three-dimensional body. There has been no easy and automated way to remove the supports of three-dimensional bodies with different shapes.

As a solution to this, PTL 1 proposes placing a support made from a heat-melting and heat-removable material around a structural body and removing this support through heating after the completion of fabrication. This seems to be a relatively easy way of removing the support.

CITATION LIST

Patent Literature

PTL 1: Japanese Patent Laid-Open No. 2014-24329

SUMMARY OF INVENTION

Technical Problem

PTL 1 mentions paraffin wax as an example material for the support and uses the property of paraffin wax generally called sharp melting, which means a phase change from liquid to solid that occurs in a narrow temperature range. Such materials, however, often have relatively large "heat of fusion." Melting a material with a large heat of fusion by heating and placing the molten material to support the three-dimensional body involves large consumption of energy. Although the support can also be made of polymers, some of sharp-melting polymers have a low "thermal conductivity." In the method proposed in PTL 1, in which the three-dimensional body to be fabricated is inevitably surrounded by the support as part of its manufacturing process, it takes a long time to deliver heat to the depths of the support, limiting the production speed.

Solution to Problem

Certain aspects of the invention reduce the energy consumption associated with the formation of a support from a phase-change material and accelerate the production of a three-dimensional body.

An aspect of the invention is a method for manufacturing a three-dimensional body. This method includes placing around an in-process three-dimensional body a support for holding up the in-process three-dimensional body and producing the three-dimensional body while holding up the in-process three-dimensional body with the support. This method is characterized in that the support is made from a support material including a plurality of materials with different melting points, and that the support is placed while the support material is controlled to a temperature at which a first material, one of the plurality of materials that has the lowest melting point, flows while the others remain solid.

Advantageous Effects of Invention

Certain aspects of the invention reduce the consumption of energy associated with the formation of a support from a phase-change material and greatly accelerate the production of a three-dimensional body.

Further features of the present invention will become apparent from the following description of exemplary embodiments with reference to the attached drawings.

DESCRIPTION OF EMBODIMENTS

Figure 1:
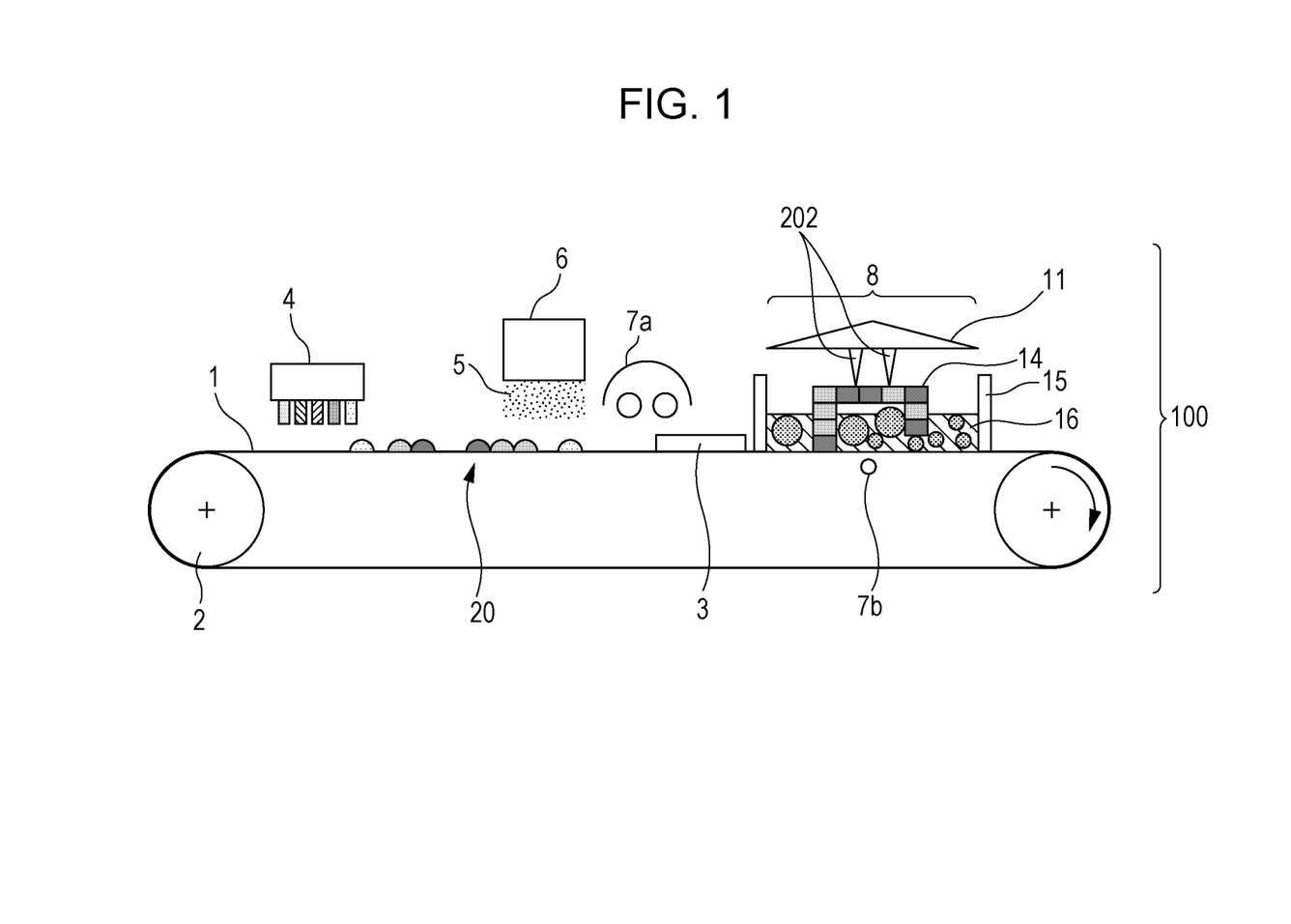
FIG. 1 is a schematic view of an additive fabrication apparatus according to an embodiment.

FIG. 1 is a schematic view of an additive fabrication apparatus (an apparatus for additive fabrication) 100 as an example of a three-dimensional body-manufacturing apparatus (an apparatus for the manufacture of a three-dimensional body) that makes possible the method according to an aspect of the invention for the formation of a three-dimensional body (also referred to as a structural body). This apparatus is used to perform cross-sectional patterning of a three-dimensional body (a process of stacking cross-sectional patterns of the three-dimensional body) on a belt-shaped internal transfer unit 1. Conveyor rollers 2 as a transport mechanism transport an ink pattern 20 through the individual process units. The resulting pattern layer 3 is conveyed to a stacking device 8 and placed on an in-process three-dimensional body 14. The intermediate transfer unit 1 serves as a temporary recording medium.

The intermediate transfer unit 1 is subjected to the formation of the pattern layer 3 on its surface and subsequent transfer of the pattern layer 3 to the three-dimensional body. Thus, the intermediate transfer unit 1 can be made of a material from which the build material, i.e., the material from which the pattern layer 3 is formed, can be easily released. Releasability is not essential for the process of transfer. For example, incomplete transfer as in offset printing does not make the formation of the three-dimensional body totally impossible. Complete transfer of the pattern layer 3 from the intermediate transfer unit 1 is, however, a way for good build accuracy.

The use of an elastic intermediate transfer unit 1 leads to stable transfer. The intermediate transfer unit 1 can be made of, for example, silicone rubber or fluorocarbon rubber. If the intermediate transfer unit 1 is made of any such material, its surface may be treated before use because the pattern layer 3 formed thereon can be repelled, depending on the material being patterned. As for the hardness of the rubber, hard rubbers are suitable for thick elastic bodies, and soft rubbers are suitable for thin elastic bodies, although this may differ depending on the actual thickness of the elastic body. If the elastic body is thick, hard rubbers such as those with hardness values of approximately 80° can be used. If the intermediate transfer unit 1 is thin and belt-shaped as in the illustrated apparatus, however, the intermediate transfer unit 1 can be a relatively soft rubber having a hardness of approximately 50° to 20° in the form of a thin film approximately 0.1 to 0.5 mm thick. If increased accuracy is needed, the intermediate transfer unit 1 can be a sheet of Teflon (registered trademark) or a smooth film coated with a submicron-thick layer of release agent, which are both non-elastic media. If a non-elastic intermediate transfer unit is used, however, applying uniform pressure to the entire recording medium and the entire surface of the intermediate transfer body requires high dimensional accuracy of the apparatus and its components as well as good skills in maneuvering them. Thus, the material for the intermediate transfer unit 1 can be selected according to the purpose.

If the build material is a metal powder or similar, the surface of the intermediate transfer body 1 may be treated with boron nitride or any other highly heat-resistant substance for improved release.

The following describes a stacking step conducted using this additive fabrication apparatus.

The apparatus in FIG. 1 first jets ink from an inkjet device 4 onto an intermediate transfer unit 1 to form an ink pattern 20 on the intermediate transfer unit 1. The inkjet device 4 is merely an example and not the only option for the formation of the ink pattern. For example, methods in which a plate is used, such as flexography, can also be used. Such methods can be applied even to the creation of a three-dimensional body by, for example, printing shape patterns in multiple levels within a plate by multiple imposition and then continuously stacking several layers each including the multiple levels of shape patterns.

Inkjet patterning allows an intended pattern of liquid to be drawn in a noncontact fashion. As a general rule, a variety of inkjet processes can be used as necessary as long as they are able to jet liquid, including thermal, piezoelectric, electrostatic, and continuous processes. The printhead can be a single-nozzle one (or a dispenser), and can also be a line printhead, which has many nozzles. The use of a line printhead leads to higher productivity.

The ink can be made of any material compatible with the powder coming from a build material applicator (described hereinafter). The ink can therefore be an aqueous or oil-based one. The ink pattern 20 may be leveled to a sufficiently small thickness before the application of the powder. In this regard, aqueous inks can be designed with high volatile contents, and volatile substances for aqueous inks are highly safe.

When the powder to be applied is a plastic material, however, the aqueous ink may be incompatible with it because plastic materials often have lipophilic surfaces. In such a case, treatments such as adding a water-soluble organic solvent or a surfactant to the ink will improve the compatibility.

A possible approach is to apply an aqueous ink that contains additives including a water-soluble organic solvent and a surfactant and then evaporate the water out of the ink to increase the proportion of the water-soluble organic solvent. This makes the ink more compatible with the powder.

The water-soluble organic solvent can be of any kind. It is possible to select a solvent suitable for the other materials used therewith according to its characteristics such as surface tension, ease in drying, and viscosity. Examples of water-soluble organic solvents that can be used include amides such as dimethylformamide and dimethylacetamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, 1,2,6-hexanetriol, thiodiglycol, hexylene glycol, and diethylene glycol, lower alkyl ethers of polyhydric alcohols such as ethylene glycol methyl ether, diethylene glycol monomethyl ether, and triethylene glycol monomethyl ether, monohydric alcohols such as ethanol, isopropyl alcohol, n-butyl alcohol, and isobutyl alcohol, and other solvents such as glycerol, N-methyl-2-pyrrolidone, 1,3-dimethyl-imidazolidinone, triethanolamine, sulfolane, and dimethylsulfoxide.

Examples of surfactants that can be used include fluorinated, silicone, water-soluble anionic, cationic, nonionic, and amphoteric surfactants.

When the image is formed on the intermediate transfer unit 1, the surface may be highly repellent to the ink. In such a case, the ink may be used in combination with a reaction solution that produces a less-fluidic liquid mixture through a chemical reaction upon contact with the ink. The kind of reaction the reaction solution takes part in and the reactant contained in the reaction solution are selected according to the purpose and the ink combined therewith. For instance, if an aqueous ink, a possible option for the inkjet ink, is taken as an example, reactions such as aggregation, gelation, salt precipitation, and acid-base reaction can be used alone or in combination, preferably aggregation. In particular, combinations of a pigment ink and a reaction solution containing a metal salt allow for designs with low total binder contents, give the image a good quality as a result of a small thickness of the ink coating, and provide higher productivity by reacting rapidly.

The reactant can be, for example, an ionic substance in reverse polarity with respect to the ink. The ordinary inkjet inks may be designed to be anionic, and the reactant for such an ink can be an aqueous solution of a metal salt, preferably an aqueous solution of a multivalent (having a valence of 2 or more) metal salt. A multivalent metal salt is composed of a multivalent metal ion and an anion binding thereto. Specific examples of multivalent metal ions include divalent metal ions such as $Ca^{2+}$, $Cu^{2+}$, $Ni^{2+}$, $Mg^{2+}$, and $Zn^{2+}$, and trivalent metal ions such as $Fe^{3+}$ and $Al^{3+}$. Examples of anions that bind to these metal ions include $Cl^-$, $NO_3^-$, $SO_4^{2-}$, $I^-$, $I^-$, $Br^-$, $ClO_3^-$, and $RCOO^-$ (where R represents alkyl).

These metal salts become more reactive when used in combination with an acid. Acids, which can be easily brought into reaction through the addition of a basic component to the ink, can also be used alone.

The acid can be an organic acid. Specific examples include oxalic acid, polyacrylic acid, formic acid, acetic acid, propionic acid, malonic acid, malic acid, maleic acid, ascorbic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophenecarboxylic acid, nicotinic acid, hydroxysuccinic acid, and dihydroxysuccinic acid.

The composition of the ink may include solids, but the proportion of powder in the image coating increases with decreasing solids content of the ink. In the creation of a three-dimensional body in this embodiment, for example, increasing the proportion of the powder applied in a later step will improve the strength and recyclability of the three-dimensional body.

By forming the ink pattern 20 from a colored ink, it is possible to create a colored structural body.

Then a powder 5 is applied to the ink pattern 20. The powder 5 can be a powder finer than the dot resolution of the ink pattern 20, and can be a powder of any material that can be formed into a film. An example is a powder of any thermoplastic resin that can be formed into a film by heating. Other examples include glass beads and a metal powder, which are usable when the ink pattern 20 contains an adhesive agent that allows the beads or powder to be formed into a film. Thermoplastic resins provide strong and lightweight structures. It is, of course, possible to use the solids in the ink as the only build material without applying a separate powder. The powder, if used, provides the main component of the three-dimensional body and therefore needs to be selected according to the purpose of use of the three-dimensional body (e.g., strength and ease of coloring).

The apparatus in FIG. 1 forms the ink pattern 20 first and then applies the powder 5, but this is not the only possible order. For example, if inkjet recording or any other noncontact recording method is used to form the ink pattern 20, it is possible to apply the powder 5 to the intermediate transfer unit first and then apply the ink to the powder.

The order of application of the binding material and the powder is not critical, as long as the two materials meet at the section of the intermediate transfer unit 1 where the pattern layer is to be formed.

The material from which the powder 5 is made may be surface-treated or coated for improved ease of application or coloring. Specific examples include hydrophilization through irradiation with energy and the formation of an antistatic coating.

The thickness of the pattern layer 3 is influenced by the powder 5 used. Naturally, the thickness of the pattern layer increases with increasing particle diameter of the powder. Likewise, the layer becomes more uniform in thickness with increasing uniformity in particle diameter of the powder.

The build material applicator 6 in FIG. 1 illustrates a mechanism that dusts the ink pattern 20 with the powder 5 like a shower, but this is not the only option for the application of the powder. For example, the powder 5 may be spread with a squeegee, and it is also possible to spray the powder 5 using air pressure. Any powder that is out of the ink pattern 20 can not only be removed using an air knife, but also devices that remove the powder using vibration or aspiration are acceptable. The methods for the application and removal of the particles can both be selected according to the characteristics of the particles. When the powder 5 is applied by spraying or similar, it may be possible to apply the powder and remove any unnecessary powder at a time, depending on the material and the conditions.

In this embodiment, the powder 5 is patterned with the use of the adhesiveness of the liquid. This means that the powder 5 can be made of any material that can be formed into particles. If the applied particles are finally fused into a single entity, the material can be, for example, a thermoplastic resin. Examples include thermoplastic resins such as polyethylene, polypropylene, nylon, ABS, polylactic acid, polystyrene, polyvinyl chloride, polymethyl methacrylate, polytetrafluoroethylene, ionomers, and EVA. Besides resins, materials that can be melted and shaped by heating can be used, including metals, glass, and ceramics. The surface of the powder 5 may be treated for improved adhesion of the ink, enhanced color saturation, and reinforced connection between particles. The particles can be in any shape, but spherical particles are easy to apply to the pattern formed section and remove from the non-image section (outside of the pattern formed section).

Then the powder pattern on the belt-shaped intermediate transfer unit 1, formed by the ink and the powder 5, is conveyed to the position of a heating device 7a, with which the powder pattern is exposed to thermal radiation. The powder is fused, and the pattern is formed into a film, a pattern layer 3. The heating device 7a can be based on any mode of heating. For example, the heating unit can be a heating roller, which provides contact heating, or an IR or microwave generator, which provides noncontact heating. It is also possible to heat the powder pattern with a scan of laser light or any similar energy radiation over the pattern. The heating device 7b may be located on the back of the intermediate transfer unit 1.

The apparatus in FIG. 1 forms the pattern layer 3 from ink and a powder, but this aspect of the embodiment also covers other approaches.

For example, the pattern layer 3 may be obtained by jetting an UV-curable resin from an inkjet nozzle to form a pattern and curing this pattern through exposure to light, and may also be obtained by placing a thermoplastic resin in the molten state using a heating nozzle.

It is also possible to form a powder pattern that contains a light-curable component, such as an ultraviolet-curable component, in addition to ink and a powder and make this pattern into a film through exposure to light. The ink used to pattern the powder may be an UV ink, or alternatively an UV-curable material may be applied after the patterning of the powder. In this case, it is possible to transfer and bond the pattern at a time by irradiating the pattern with the curing light while pressing it against the surface to which it is to be transferred.

The pattern layer 3 obtained as one of the constitutional units of the three-dimensional body in this way is then conveyed in the molten state to the position of a stacking device 8. After the pattern layer 3 is positioned as designed, the roof 11 is brought down to make the in-process three-dimensional body 14 come into contact and union with the pattern layer 3.

Then a support material for the formation of a support 16 is applied.

In this aspect of the embodiment, the support 16 is made from a support material that includes two or more materials with different melting points, with any material other than that with the lowest melting point being a solid powder. The support material may include three or more materials with different melting points.

The apparatus in FIG. 1 includes walls 15 in which the in-process three-dimensional body is to be enclosed. During the stacking step, the walls 15 move up and down in conjunction with the roof 11 of the stacking device 8, down to a position where it comes into full contact with the intermediate transfer unit 1.

When the support material for the support 16 is poured in the flowing state inside the walls 15, the material fills the space around the in-process three-dimensional body 14. In this state, cooling the material into a solid gives a support 16.

The support 16 in this embodiment is formed from a support material that includes multiple materials with different melting points. Only the material with the lowest melting point is liquid throughout the process from the mixing of these materials to the application of the mixture. The most relevant condition is temperature, but other conditions, such as environmental pressure, are also relevant.

In this embodiment, the support material for the formation of the support 16 is in the flowing state while being placed around the in-process three-dimensional body 14. In this operation, the support material for the support 16 need not be totally liquid. The purpose is accomplished when at least part of the support material is liquid. In fact, if two or more of the ingredients of the support material are liquid, these ingredients are mixed. This should be avoided in fluidizing the support material.

The temperature of the support material while being poured can be equal to or lower than the melting point of the in-process three-dimensional body 14. This prevents the thermal deformation of the in-process three-dimensional body 14.

The support material can even be a combination of materials whose melting points are lower than that of the in-process three-dimensional body 14, as long as the pouring temperature is controlled.

An example is a case where the powder 5 for the formation of the three-dimensional body is made from polypropylene (a melting point of 160° C.) and the support material is a mixture of polyethylene glycol (a melting point of 60° C.) and aluminum particles (a melting point of 660° C.). In this case, the above condition is satisfied when the temperature of the support material at pouring is in the range of 60° C. to 160° C.

Another example is a case where the powder 5 for the formation of the three-dimensional body is made from nylon (a melting point of 230° C.) and the support material consists of polyethylene glycol (a melting point of 60° C.) and polypropylene particles (a melting point of 160° C.). In this case, too, the above condition is satisfied when the temperature of the support material at pouring is in the range of 160° C. to 60° C.

As can be seen from these two cases, a degree of the difference between the lowest and second lowest melting points among the materials in the support material is not strongly limited. However, when this difference is 60° C. or more, preferably 100° C. or more, it is easy to control the pouring temperature. The pouring process becomes more stable with increasing difference between the lowest and second lowest melting points among the materials in the support material. For this reason, and in expectation of high thermal conductivity, the support material may include metal particles.

Plastics soften in broad ranges of temperatures, and their melting points are difficult to identify. Thus, if the three-dimensional body is formed from a plastic material, the formula of the support material can be such that the difference between the lowest melting point among its ingredients and the melting point of the material for the formation of the three-dimensional body is maximized. This difference can be 30° C. or more, preferably 50° C. or more, although this may differ depending on the material used to form the three-dimensional body.

Various materials may be used in the support material, including metals, ceramics, glass, resins, and polymers. One particular example is a combination of a sharp-melting polymer for a low-melting point component and metal particles for a high-melting point component, such as the aforementioned combination of a water soluble material such as polyethylene glycol and aluminum particles.

When the support material includes some materials with greatly different specific gravities, the high-melting point component (the component having the higher melting point than the component with the lowest melting point) may be in the form of hollow particles.

The combination is such that the high-melting point component does not dissolve when the low-melting point component (the component having the lower melting point) is melted.

The support material may be poured as a mixture of the low-melting point and high-melting point components, and it is also possible to pour the individual components separately.

For example, it is possible to sprinkle a predetermined amount of particles of the high-melting point component inside the walls 15 first and then pour the low-melting point component in the molten state stepwise to mix the two components inside the walls 15. Another example is to pulverize the low-melting point component without heating, sprinkle the obtained particles together with particles of the high-melting point component, both in the solid state, inside the walls, and then heat the particles moderately to melt the low-melting point component only.

The stacking device of the apparatus in FIG. 1 has an inner space in which a support material as a mixture of high-melting point and low-melting point components is to be held. The support material 16 can be set in this space before the start of fabrication, and this provides a system for automated dropping and reloading that uses the heat left after each layer of the structural body is heated and added. FIG. 2 illustrates this reloading process.

Figure 2A:
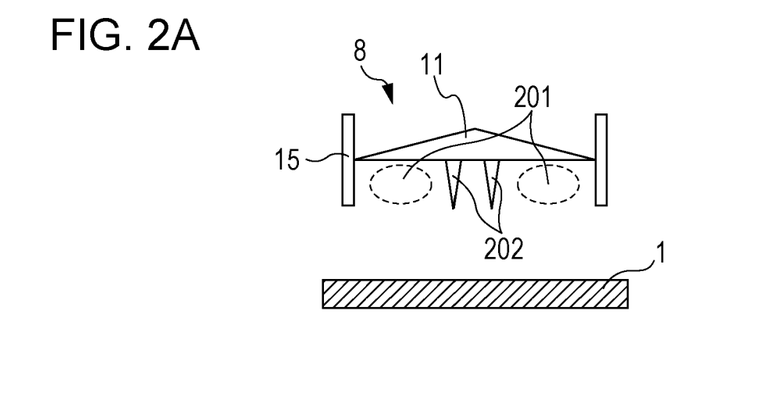
FIG. 2A is a schematic diagram illustrating an example of a method according to an embodiment for the placement of a support material.

FIG. 2A illustrates a state where no support material has been set. The stacking device 8, which moves up and down, has in its lower section posts 202 extending from the roof 11. Around these posts, there is a space 201 in which the support material 203 can be set.

Figure 2B:
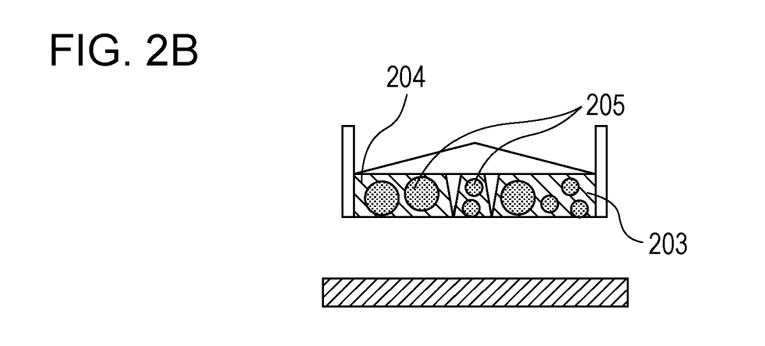
FIG. 2B is a schematic diagram illustrating an example of a method according to an embodiment for the placement of a support material.
Figure 2C:
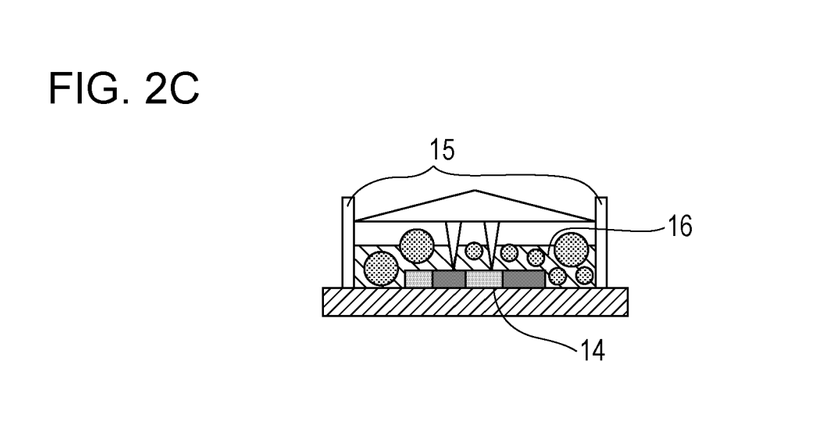
FIG. 2C is a schematic diagram illustrating an example of a method according to an embodiment for the placement of a support material.
Figure 2D:
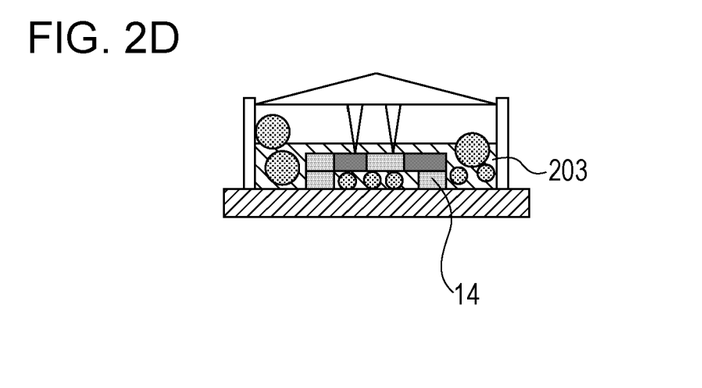
FIG. 2D is a schematic diagram illustrating an example of a method according to an embodiment for the placement of a support material.
Figure 2E:
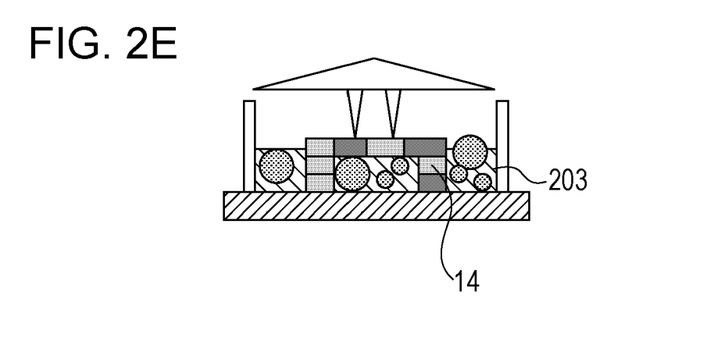
FIG. 2E is a schematic diagram illustrating an example of a method according to an embodiment for the placement of a support material.

FIG. 2B illustrates a state where the support material 203 has been set in this space for holding the support material 203. In order for the support material to be set in this way, the stacking device 8 is, for example, brought down to a position where the posts 202 come into contact with the surface of the intermediate transfer unit 1. At this position, the support material is loaded into the space inside the walls 15 with only the low-melting point component 204 in the thermally molten state. After cooling the material into a solid, lifting up the stacking device leads to the state illustrated in FIG. 2B. FIG. 2C illustrates a state where the first layer of the in-process three-dimensional body 14 has been deposited. The stacking device 8 moves up to a height corresponding to the thickness of the first layer. As for the support material, the low-melting point component 204 melts because of the heat transmitted from the in-process three-dimensional body 14 and the intermediate transfer unit 1, and falls down to the surface of the intermediate transfer unit 1 together with the high-melting point component 205, which remains solid. This creates near the interface between the roof 11 and the posts 202 a space corresponding to the volume of the support material that has fallen down. Although this space can be loaded with additional support material, this is unnecessary if the existing support material is sufficient to hold the in-process three-dimensional body 14.

Figure 2F:
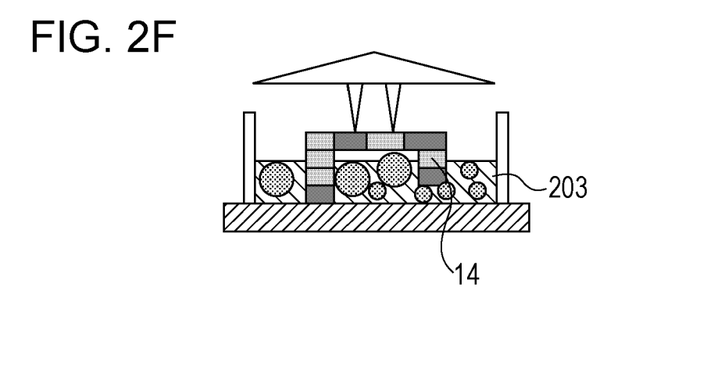
FIG. 2F is a schematic diagram illustrating an example of a method according to an embodiment for the placement of a support material.

In this state, the low-melting point component 204 of the support material is cooled into a solid. The in-process three-dimensional body 14 and the support 16 made from the solidified support material are detached from the surface of the intermediate transfer unit 1 as the stacking device 8 moves up. Repeating this leads to a state where the second layer has been added (FIG. 2D), a state where the third layer has been added (FIG. 2E), and a state where the fourth layer has been added (FIG. 2F). This method therefore allows the user to build up a three-dimensional body by stacking its layers while sliding down the support material with respect to the in-process three-dimensional body. By adding units on a half-finished body in this way, the three-dimensional body is completed step by step. The heating device 7b may also heat the support material 203 in such a manner that the low-melting point component 204 flows while the in-process three-dimensional body and the high-melting point component 205 remain solid.

This approach negates the need for the inside of the walls 15 to be completely filled with the support material. The fabrication process can be finished with a very small amount of support material by loading, melting, and solidifying a volume corresponding to any thickness that provides a strength required for holding the three-dimensional body each time a layer is added.

In this approach, however, it is difficult to control the temperature of the support material because the support material makes a spontaneous fall upon melting.

Another possible approach is to add layers on the top of the existing layers of the three-dimensional body as opposed to the direction in FIGS. 1 and 2A to 2F.

In this case, the support material does not make a spontaneous fall, and it is needed to pour additional support material into the space to fill the inside of the walls 15 with the support material. This approach therefore consumes more support material than the first one, in which the support material is allowed to fall upon melting. In this approach, however, it is easier to control the temperature of the support material at pouring than in the first one, giving more options for the materials that can be used in the support material.

The additional support material does not need to be poured each time a layer is added. It is possible to load a certain amount at a time after some layers are added.

A larger space for loading gives greater freedom of choice regarding the size of the particles in the support material that are used in the solid state.

These variables, i.e., the direction of layer stacking and the methodology for loading the support material, can be selected according to the materials used and the quality of the structural body to be manufactured.

In this embodiment, the only requirement is that a support composed of high-melting point and low-melting point components be placed around the in-process structural body during the period between the addition (bonding) of a new pattern layer to the in-process three-dimensional body and detachment from the intermediate transfer unit. After such a support is placed in this way, the low-melting point component 204 is cooled into a solid. In this state, the in-process three-dimensional body 14 can be detached from the intermediate transfer unit 1 while being held in the support and therefore is ready for the addition of the next pattern layer. This is repeated a predetermined number of times until the last pattern layer is added.

Although the apparatus in FIGS. 1 and 2A to 2F includes the walls 15 to define a space into which the support material is to be loaded, the walls 15 are not essential. It is possible to place the support material around the area for the formation of pattern layers instead.

Figure 3A:
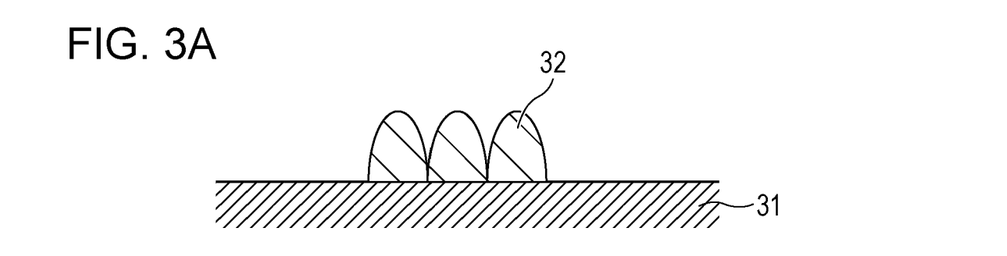
FIG. 3A is a schematic diagram illustrating another example of a method according to an embodiment for the placement of a support material.
Figure 3B:
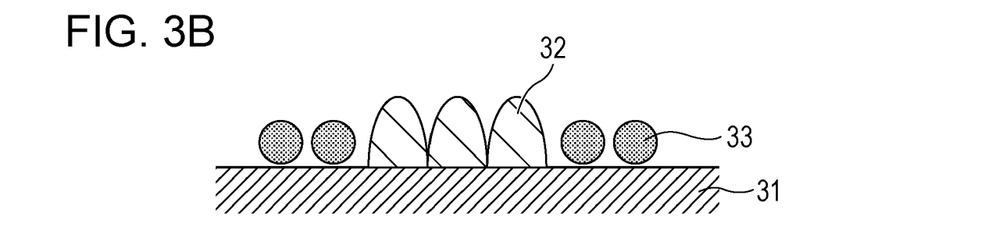
FIG. 3B is a schematic diagram illustrating another example of a method according to an embodiment for the placement of a support material.
Figure 3C:
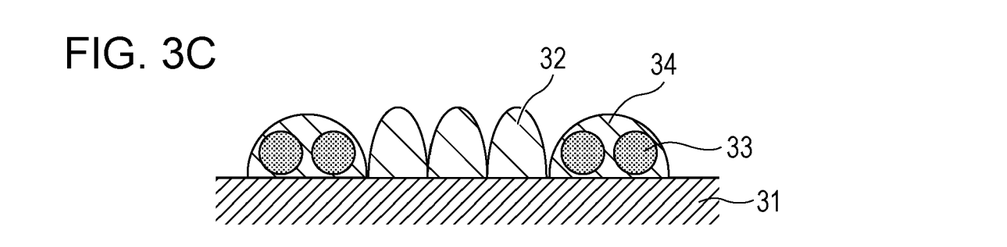
FIG. 3C is a schematic diagram illustrating another example of a method according to an embodiment for the placement of a support material.
Figure 3D:
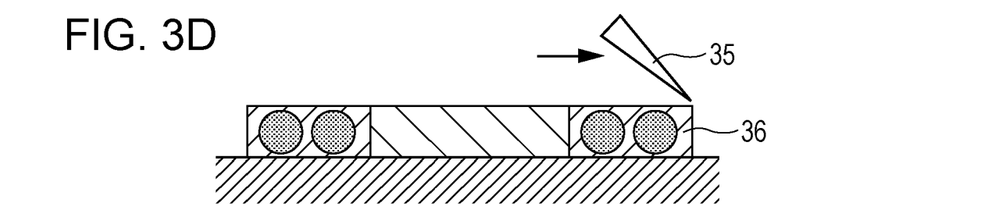
FIG. 3D is a schematic diagram illustrating another example of a method according to an embodiment for the placement of a support material.

For example, FIGS. 3A to 3D illustrate a case where the structural units and the low-melting point component are applied from an inkjet device. FIG. 3A illustrates a state where a build material 32 has been patterned and formed into a pattern layer on a bed 31. The application of the build material 32 to the bed 31 is through an inkjet process. As illustrated in FIG. 3B, this bed is sprinkled with a high-melting point component 33 as a component of the support material from which the support for the built structure is made. Examples of materials that can be used as the high-melting point component 33 are similar to those for the high-melting point component 205 of the support material described above. Then as illustrated in FIG. 3C, a low-melting point component 34 as another component of the support material is applied from an inkjet device to the positions around the build material 32. For this low-melting point component 34, too, examples of materials that can be used are similar to those for the aforementioned low-melting point component 204. After being cooled into a solid, the low-melting point component 34 is scraped together with the build material 32 to a predetermined thickness as illustrated in FIG. 3D. The illustrated case uses a removing unit 35, such as a cutter or a polisher. A support 36 including the low-melting point component 34 and the high-melting point component 33 is formed in this way, providing a pattern layer surrounded by the support. By repeating the process in FIGS. 3A to 3D, it is possible to stack layers in a way similar to the stacking of layers described referring to FIGS. 1 and 2A to 2F.

Figure 5A:
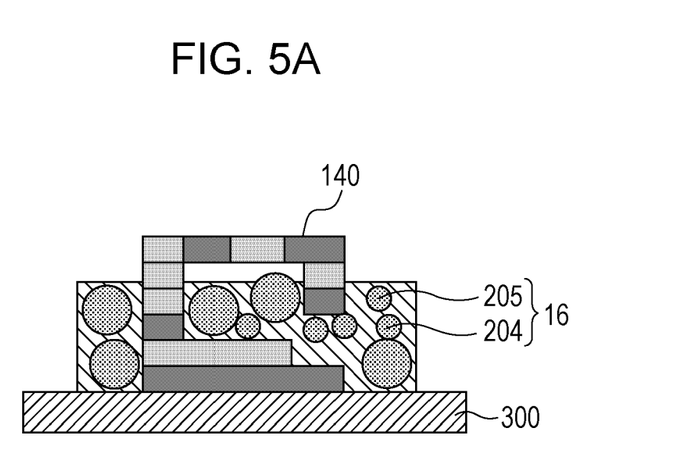
FIG. 5A is a diagram used to describe the removal of a support in an embodiment.
Figure 5B:
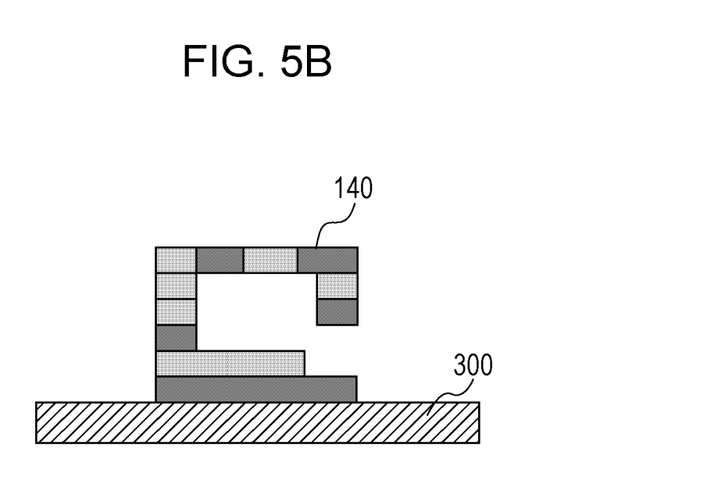
FIG. 5B is a diagram used to describe the removal of a support in an embodiment.

The following describes the removal of the support from the finished three-dimensional body with reference to FIGS. 5A and 5B.

FIGS. 5A and 5B are cross-sectional views of a three-dimensional body taken at the same position as in FIGS. 2A to 2F. FIG. 5A schematically illustrates the three-dimensional body 140 with all layers stacked through the repeated addition of layers described referring to FIGS. 2A to 2F. As can be seen from the drawing, the finished three-dimensional body 140 on the work bench 300 is completely or partially surrounded by a support 16.

When the low-melting point component 204 in the support 16 is heated to its melting point, the low-melting point component 204 turns into a liquid, and the materials making up the support separate from the structural units of the three-dimensional body 140. This makes the entire three-dimensional body 140 exposed as illustrated in FIG. 5B.

The low-melting point component 204 has a large heat of fusion. It therefore takes a long time to heat this component. The high-melting point component 205 as a mix-in component, which does not melt at the melting point of the low-melting point component 204, requires no heat of fusion. The energy requirement is accordingly reduced.

Naturally, a higher proportion of the high-melting point component 205 to the low-melting point component 204 is more effective. However, the high-melting point component 205 alone may lack adhesiveness between particles. The support material exhibits its full potential when the proportion of the high-melting point component in the support 16 is 60% or less.

The low-melting point component 204 can be a polymer, but polymers have low thermal conductivity. This means that when the support material consists only of polymers, the support as a layer conducts heat to its depths more slowly with increasing its thickness. Adding a high-melting point component that has high thermal conductivity, such as a metal, to the support material will help heat to reach the depths, greatly reducing the time required to remove the support 16.

Removing the support 16 by heating it while preventing the high-melting point component 205 from reaching its melting point will bring the removed material into a state where the high-melting point component 205 and the low-melting point component 204 are separate phases. In this state, the removed support 16 can be collected and reused.

If the support 16 does not need to be reused, it is possible to remove the support 16 more quickly by heating it to allow the high-melting point component 205 to reach its melting point.

In determining the extent of heating to remove the support 16, the temperature tolerance of the three-dimensional body needs to be considered.

Figure 4:
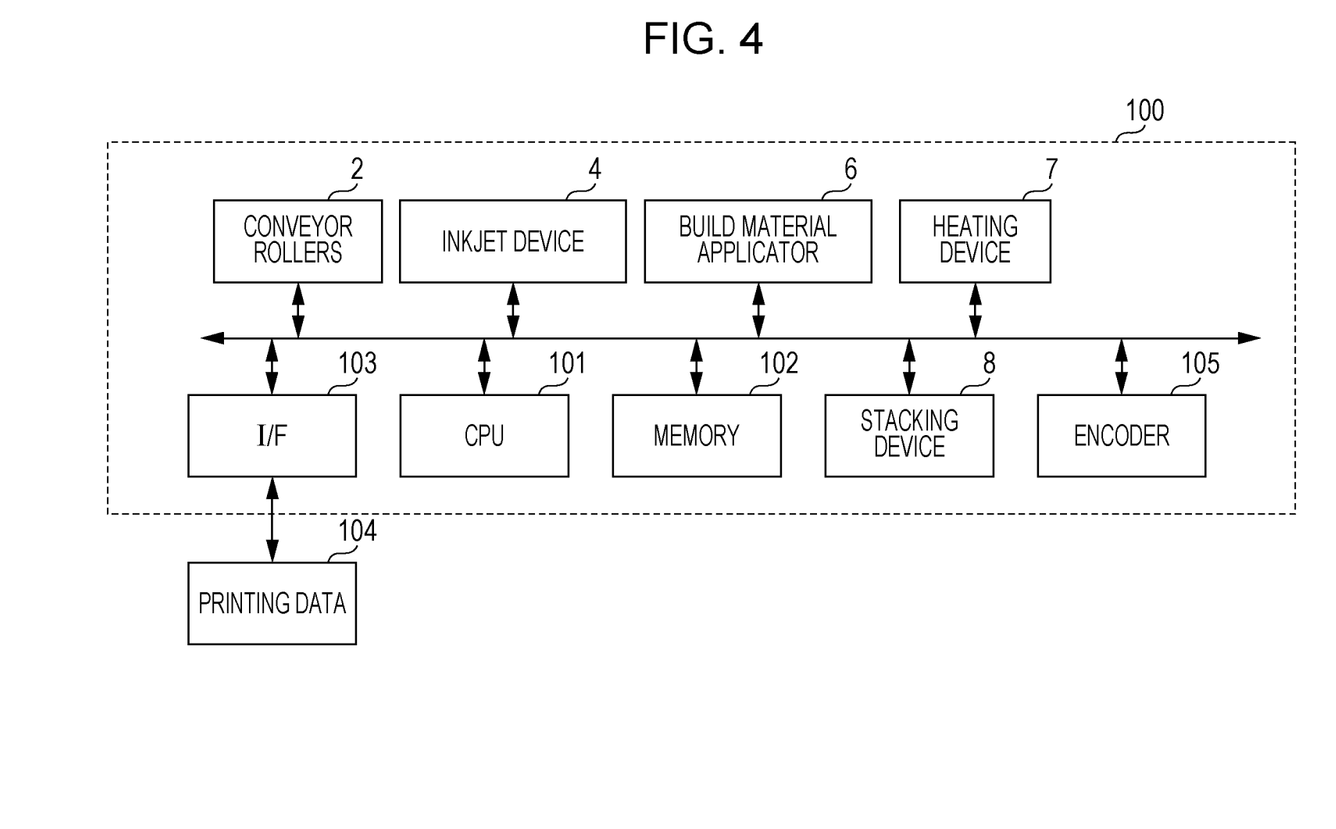
FIG. 4 is a block diagram illustrating an example of a control system for an additive fabrication apparatus according to an embodiment.

FIG. 4 illustrates an example of a control system for the additive fabrication apparatus in FIG. 1. In the additive fabrication apparatus 100, a CPU 101 is the central control unit for the system. A memory 102 includes elements such as a ROM that contains operating programs for the CPU and a RAM used to store and process printing data 104 acquired via an interface 103.

In response to an instruction to start printing, the CPU converts the printing data into sliced data for actual patterning in accordance with the given conditions, and calculates where to place the walls on the basis of the sliced data.

The sliced data and the data on the positions of the walls are sent to the inkjet device 4. At this point of time, the CPU 101 communicates with the conveyor rollers 2, the inkjet device 4, the build material applicator 6, the heating device 7 (including heating device 7a, heating device 7b), and the stacking device 8 to check their status. If they are ready to print, the conveyor rollers 2 convey the intermediate transfer unit 1. After the intermediate transfer unit is positioned as instructed by an encoder 105, the inkjet device 4, the build material applicator 6, the heating device 7, and the stacking device 8 operate as programmed. Repeating this a specified number of times completes the three-dimensional body.

The following describes an aspect of the invention in more detail by providing examples.

EXAMPLE 1

Additive fabrication was performed using an apparatus configured as illustrated in FIG. 1.

The data on the structure to be fabricated was converted into sliced data with a given interslice gap beforehand. In Example 1, sliced data with a 100-μm gap was used.

A belt-shaped 0.1-mm invar film was used as the intermediate transfer unit 1 with its surface covered with polyimide tape (3M; trade name, 5419).

Inks (CMYK) having the following formulae were applied using the inkjet device 4 to the positions according to the shape of the cross-section to be formed, producing an ink pattern 20.

Ink Formulae 3 parts by mass of pigment

Black (K), carbon black (Mitsubishi Chemical; trade name, MCF88); cyan (C), Pigment Blue 15; magenta (M), Pigment Red 7; yellow (Y), Pigment Yellow 74

1 part by mass of styrene-acrylic acid-ethyl acrylate copolymer (acid value, 240; weight-average molecular weight, 5000)

10 parts by mass of glycerol 5 parts by mass of ethylene glycol 1 part by mass of surfactant (Kawaken Fine Chemicals; trade name, Acetylenol EH)

80 parts by mass of purified water

Warm air at 50° C. was sent out from a drying device (not illustrated in FIG. 1) for approximately 5 seconds to reduce the thickness of the ink pattern 20.

Polypropylene particles (an average particle diameter of 100 μm) as a build material were applied on the blowing air to the ink pattern 20 on the intermediate transfer unit 1.

The colored powder pattern was melted into a film, a pattern layer 3, by heating to approximately 180° C. using the heating device 7a.

The pattern layer 3 was conveyed to the position of the stacking device 8 and positioned. The roof 11 of the stacking device 8 was brought down to a position where the gap between the bottom of the posts 202 of the stacking device 8 to the surface of the intermediate transfer unit 1 was 45 μm, making the bottom of the posts 202 come into contact with the top of the pattern layer 3. The space 201 around the posts had been loaded with a support material 203, and the loading temperature had been 180° C. (the formula below) for the formation of a support in advance (FIG. 2B). The pattern layer 3, which was kept at 180° C. (stacking temperature) in a heated state, was brought into contact with the support material 203 with the heat remaining therein. Through this, heat was transmitted from the pattern layer 3 to the support material 203 to melt part of its components, and thereby to drop the support material down to the positions around the in-process three-dimensional body 14 (FIG. 2C). The support material 203 was cooled until every part of it was hardened.

Support Material Formula 1

Support material A (used in the liquid state): 60 parts by volume of polyethylene glycol 2000 (melting point of 60° C.)

Support material B (used in the solid state): 40 parts by volume of aluminum spheres (average particle diameter of 100 μm, melting point of 660° C.)

This procedure was repeated a total of roughly 2000 times, adding new layers on the existing stack. In this way, an approximately 9-cm tall three-dimensional body was completed.

The support was removed through heating at 60° C. in a furnace and dissolving the polyethylene glycol in water, yielding a finished three-dimensional body.

EXAMPLE 2

Additive fabrication was performed with the following change to the formula of the support material used in Example 1. The other details were the same as in Example 1.

Support Material Formula 2

Support material A (used in the liquid state): 60 parts by volume of polyethylene glycol 2000 (melting point of 60° C.)

Support material B (used in the solid state): 40 parts by volume of glass spheres (average particle diameter of 100 μm, melting point of 600° C.)

COMPARATIVE EXAMPLE 1

The fabrication process was performed using polyethylene glycol 2000, support material A in Examples, as the only support material, not using support material B. The other details were the same as in Example 1.

The materials and heating conditions used in Comparative Example 1 and Examples 1 and 2 are summarized in Table 1, along with the results of fabrication.

EXAMPLES 3 to 8

A three-dimensional body was fabricated in the same way as in Example 1, except that the build and support materials specified in Table 1 were used, that the heating temperature of the heating device 7a for the pattern layer 3 was changed, and that the support material was loaded at the temperature given in Table 1.

In Example 8, a three-component support material was used.

COMPARATIVE EXAMPLES 2 to 5

A three-dimensional body was fabricated in the same way as in Example 1, except that the build material and support materials specified in Table 1 were used, and that the support material was loaded at the temperature given in Table 1.

In Comparative Examples 5, a three-component support material was used.

Examples 1 and 2 finished the fabrication process faster and consumed less energy than Comparative Example 1. In Example 1, there were 47% and 36% decreases in lead time and power consumption, respectively, from Comparative Example 1. In Example 2, there were 33% and 17% decreases in lead time and power consumption, respectively, from Comparative Example 1.

Examples, in which the support material was loaded under conditions where only the component with the lowest melting point was liquid, successfully provided a three-dimensional body.

In Comparative Examples 2 to 5, the support material was loaded under conditions where two or more of its components were liquid and where the build material was also melted. The three-dimensional bodies obtained in these comparative examples had fouling, which appeared to be a result of the adhesion of molten support material B or C to a molten fabricated structure.

TABLE 1

| No | Build material A (melting point) | Support material A (melting point) | Support material B (melting point) | Support material C (melting point) | Proportions of support materials (A:B:C) | Stacking temperature | Support material loading temperature | Fouling |
|---|---|---|---|---|---|---|---|---|
| Example 1 | PP (170° C.) | PEG2000 (60° C.) | Aluminum particles (660° C.) | None | 60:40:0 | 180° C. | 180° C. | No |
| Example 2 | PP (170° C.) | PEG2000 (60° C.) | Glass particles (600° C.) | None | 70:30:0 | 180° C. | 180° C. | No |
| Example 3 | PP (170° C.) | PEG2000 (60° C.) | PE particles (135° C.) | None | 70:30:0 | 180° C. | 80° C. | No |
| Example 4 | PA (255° C.) | PEG2000 (60° C.) | Glass particles (600° C.) | None | 70:30:0 | 260° C. | 260° C. | No |
| Example 5 | PA (255° C.) | PEG2000 (60° C.) | Aluminum particles (660° C.) | None | 60:40:0 | 260° C. | 260° C. | No |
| Example 6 | PA (255° C.) | PEG2000 (60° C.) | PE particles (135° C.) | None | 70:30:0 | 260° C. | 80° C. | No |
| Example 7 | PA (255° C.) | PEG2000 (60° C.) | PP particles (170° C.) | None | 70:30:0 | 260° C. | 80° C. | No |
| Example 8 | PA (255° C.) | PEG2000 (60° C.) | PE particles (135° C.) | PP particles (170° C.) | 70:15:15 | 260° C. | 80° C. | No |

TABLE 1-continued

| No | Build material (melting point) | Support material A (melting point) | Support material B (melting point) | Support material C (melting point) | Proportions of support materials (A:B:C) | Stacking temperature | Support material loading temperature | Fouling |
|---|---|---|---|---|---|---|---|---|
| Comparative Example 1 | PP (170° C.) | PEG2000 (60° C.) | None | None | 100:0:0 | 180° C. | 180° C. | No |
| Comparative Example 2 | PP (170° C.) | PEG2000 (60° C.) | PE particles (135° C.) | None | 70:30:0 | 180° C. | 180° C. | Yes |
| Comparative Example 3 | PA (255° C.) | PEG2000 (60° C.) | PE particles (135° C.) | None | 70:30:0 | 260° C. | 260° C. | Yes |
| Comparative Example 4 | PA (255° C.) | PEG2000 (60° C.) | PP particles (170° C.) | None | 70:30:0 | 260° C. | 260° C. | Yes |
| Comparative Example 5 | PA (255° C.) | PEG2000 (60° C.) | PE particles (135° C.) | PP particles (170° C.) | 70:15:15 | 260° C. | 260° C. | Yes |

PP, polypropylene resin;
PA, nylon resin;
PEG, polyethylene glycol;
PE, polyethylene resin While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for manufacturing a three-dimensional body, the method comprising placing around an in-process three-dimensional body a support for holding up the in-process three-dimensional body and placing on the in-process three-dimensional body another member to be part of the three-dimensional body while holding up the in-process three-dimensional body with the support, wherein the support is made from a support material including a plurality of materials with different melting points, and while holding the in-process three-dimensional body, the made support is heated in such a manner that a first material, one of the plurality of materials that has a lowest melting point, flows while the in-process three-dimensional body and at least one of the plurality of materials excluding the first material remain solid.

2. A method for manufacturing a three-dimensional body, the method comprising holding up an in-process three-dimensional body using a support, including providing a first pattern layer surrounded by the support and stacking the first pattern layer and a second pattern layer, and in the step of providing the first pattern layer surrounded by the support, a support material for the formation of the support including a plurality of materials with different melting points is placed around an area where the first pattern layer is to be formed, and the support material is placed through an operation of heating the support material wherein a first material, one of the plurality of materials that has a lowest melting point, flows while the in-process three-dimensional body and at least one of the plurality of materials excluding the first material remain solid.

3. The method according to claim 1, wherein the support material is placed around the in-process three-dimensional body by pouring the support material into a space around the in-process three-dimensional body.

4. The method according to claim 2, wherein the step of providing the first pattern layer includes removing part of the first material melted by the heating operation.

5. The method according to claim 1, wherein the at least one of the plurality of materials excluding the first material is more thermally conductive than the first material.

6. The method according to claim 1, wherein the three-dimensional body contains a thermoplastic resin, and at least one of the plurality of materials is metal particles.

7. The method according to claim 1, wherein the support material includes three or more materials.

8. The method according to claim 1, wherein the first material is a resin, and at least one of the plurality of materials excluding the first material is metal particles.

9. A method for manufacturing a three-dimensional body, the method comprising placing around an in-process three-dimensional body a support for holding up the in-process three-dimensional body and placing on the in-process three-dimensional body another member to be part of the three-dimensional body while holding up the in-process three-dimensional body with the support, wherein the support is made from a support material including, at least, two materials having a melting point difference of 60° C. or more, and while holding the in-process three-dimensional body, the made support is heated in such a manner that a first material, one of the two materials that has a lower melting point, flows while the other remains solid.

10. The method according to claim 3, further comprising, after placing the support material around the in-process three-dimensional body, cooling the support material to become solid.

11. The method according to claim 1, wherein the support material includes a mixture of the plurality of materials.

12. The method according to claim 1, wherein the support material comprises 60 to 70 parts by volume of the first material and 15 to 40 parts by volume of the at least one of the plurality of materials excluding the first material.

* * * * *